United States Patent
Jabri et al.

(10) Patent No.: US 7,508,970 B2
(45) Date of Patent: Mar. 24, 2009

(54) SYSTEMS, METHODS AND APPARATUS FOR DETECTING A COLLIMATION EDGE IN DIGITAL IMAGE RADIOGRAPHY

(75) Inventors: Kadri Nizar Jabri, Waukesha, WI (US); Gopal B. Avinash, New Berlin, WI (US); Gauri Kishor Joglekar, Niskayuna, WI (US)

(73) Assignee: General Electric Company, Schenectady, NY (US)

( * ) Notice: Subject to any disclaimer, the term of this patent is extended or adjusted under 35 U.S.C. 154(b) by 727 days.

(21) Appl. No.: 11/023,244

(22) Filed: Dec. 24, 2004

(65) Prior Publication Data

US 2006/0140483 A1    Jun. 29, 2006

(51) Int. Cl.
*G06K 9/00* (2006.01)
*G06K 9/48* (2006.01)

(52) U.S. Cl. .................................... 382/132; 382/199
(58) Field of Classification Search .................... None
See application file for complete search history.

(56) References Cited

U.S. PATENT DOCUMENTS

| 5,081,580 | A | * | 1/1992 | Takeo | 250/582 |
| 5,282,254 | A | * | 1/1994 | Chiu et al. | 382/132 |
| 6,836,570 | B2 | * | 12/2004 | Young et al. | 382/274 |

* cited by examiner

*Primary Examiner*—Charles Kim
(74) *Attorney, Agent, or Firm*—Peter Vogel, Esq.; William Baxter, Esq.; Michael G. Smith, Esq.

(57) ABSTRACT

Systems, methods and apparatus are provided through which collimation edges in an X-ray image are located from information in the X-ray image.

20 Claims, 11 Drawing Sheets

SYSTEMS, METHODS AND APPARATUS FOR DETECTING A COLLIMATION EDGE IN DIGITAL IMAGE RADIOGRAPHY

FIELD OF THE INVENTION

This invention relates generally to detection of edges in electromagnetic images, and more particularly to image-based collimation edge detection in medical X-ray systems.

BACKGROUND OF THE INVENTION

In X-ray systems, an X-ray beam is projected onto an X-ray receptor. Between the X-ray projector on the X-ray receptor, a collimator defines and restricts the dimensions and direction of the X-ray beam, typically as a square or rectangle onto the receptor, although other shapes of the image are implemented. The image that is projected onto the receptor has edges; the edges define the outer perimeter of the image.

The image is processed by an imaging console that is a component of the X-ray system or coupled to the X-ray system. Examples of the processing include adding labels in the image and enhancing the image. The imaging console needs data describing the location of edges of the image in order to limit the processing of the image.

In some conventional integrated X-ray systems, collimation edge localization is based on feedback obtained from a positioner, the positioner being a mechanical controller of the X-ray tube and collimator. In some implementations, a positioner is integrated into a fixed X-ray system, but provides no rotation-angle feedback on the collimator. In other implementations, feedback data from the positioner is completely unavailable such as in portable X-ray systems. In these conventional integrated X-ray systems, the positioner provides somewhat less than precise data on the location of the collimation edge.

In other conventional X-ray systems, the positioner does not communicate data that describes the image to the imaging console. Accordingly, data on the dimensions and location of the collimation edges is entered through a keyboard or mouse by a human operator to the X-ray system so that cropping of the image is performed at the outer perimeter of the X-ray image.

For the reasons stated above, and for other reasons stated below which will become apparent to those skilled in the art upon reading and understanding the present specification, there is a need in the art to more precisely locate collimation edges in X-ray images. There is a need in the art to obtain data on collimation edges in X-ray images in a manner that is more convenient to the operators of the X-ray systems.

BRIEF DESCRIPTION OF THE INVENTION

The above-mentioned shortcomings, disadvantages and problems are addressed herein, which will be understood by reading and studying the following specification.

In one aspect, collimation edges in an X-ray image are located from information within the image. In some embodiments, the location of the collimation edges is determined solely from the image information. Determining the location of collimation edges in an image from the image itself satisfies the need in the art for more convenient and higher precision location of the collimation edges in the X-ray image.

Location of the collimation edges from information derived from the image is effective in X-ray systems where feedback from a positioner is incomplete or non-existent.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, methods of embodiments are described. In the third section, the hardware and the operating environment in conjunction with which embodiments may be practiced are described. In the fourth section, particular implementations are described. Finally, in the fifth section, a conclusion of the detailed description is provided.

System Level Overview

Figure 1:
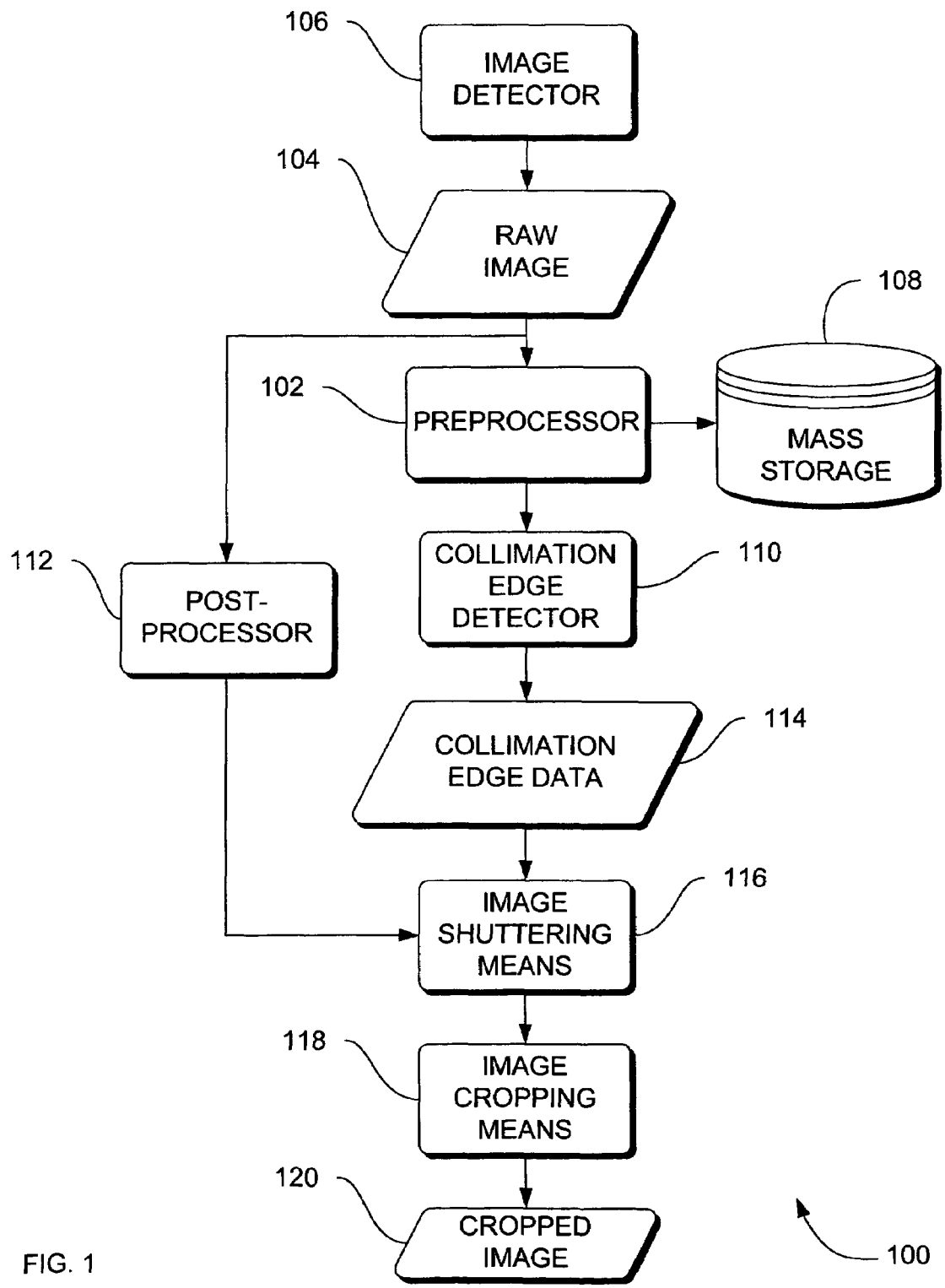
FIG. 1 is a block diagram that provides a system level overview of a system to crop a collimated portion of an image according to an embodiment.

FIG. 1 is a block diagram that provides a system level overview of a system to crop a collimated portion of an image according to an embodiment. All embodiments operate in a computer operating environment, such as computer 1002 in FIG. 10. System 100 solves the need in the art to precisely and conveniently identify and locate collimation edges in X-ray images.

System 100 includes a preprocessor 102. The preprocessor 102 is operable to receive a raw input image 104 from a digital image detector 106. The preprocessor is operable to store the raw input image 104 on a mass storage device 108.

System 100 also includes a collimation edge detector 110 operable to detect collimation edges in the raw input image 104 and a post-processor 112 of the raw input image 104 and generate collimation edge data 114 that represents or describes the location of the collimation edges in the raw input image. The collimation edge detector 110 can be incorporated, implemented or included in any digital radiography system where the raw (unprocessed) image 104 is available as input.

System 100 also includes a post-processor 112 of the raw input image 104.

System 100 also includes a shuttering means 116 that shutters a post-processed image in reference to the collimation edge data 114 generated by the collimation edge detector 110.

System 100 further includes an image cropping means 118 that crops a shuttered image in reference to the collimation edge data 114 generated by the collimation edge detector 110.

Thus, the image cropping means 118 and apparatus 100 provide a cropped image 120. The cropped image 120 is produced at least in part, if not entirely, in reference to the collimation edge data 114 extracted or derived from the pre-processed raw image 104. Thus the computer-based implementation of system 100 allows the collimation edges in X-ray images to be more precisely and more conveniently identified and localized.

While the system 100 is not limited to any particular pre-processor 102, raw image 104, detector 106, mass storage device 108, collimation edge detector 110, post-processor 112, collimation edge data 114, image shuttering means 116, image cropping means 118 and cropped image 120, for sake of clarity simplified preprocessor 102, raw image 104, detector 106, mass storage device 108, collimation edge detector 10, post-processor 112, collimation edge data 114, image shuttering means 116, image cropping means 118 and cropped image 120 are described.

Methods of an Embodiment

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions. Methods 200-900 are performed by a program executing on, or performed by firmware or hardware that is a part of, a computer, such as computer 1002 in FIG. 10

Figure 2:
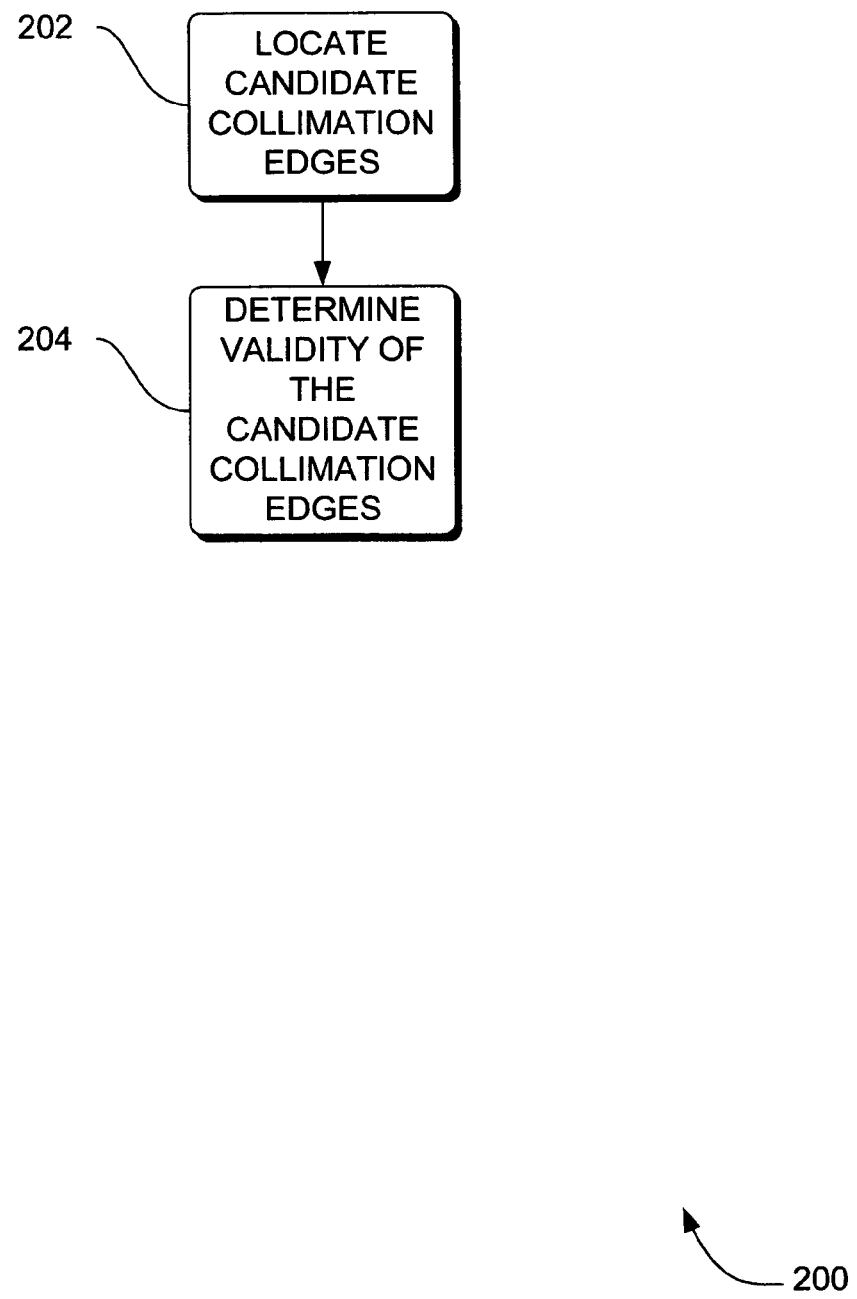
FIG. 2 is a flowchart of a method to detect an edge of an image according to an embodiment.

FIG. 2 is a flowchart of a method 200 to detect an edge of an image according to an embodiment. Method 200 solves the need in the art to more precisely and more conveniently identify and localize collimation edges in X-ray images.

Figure 6:
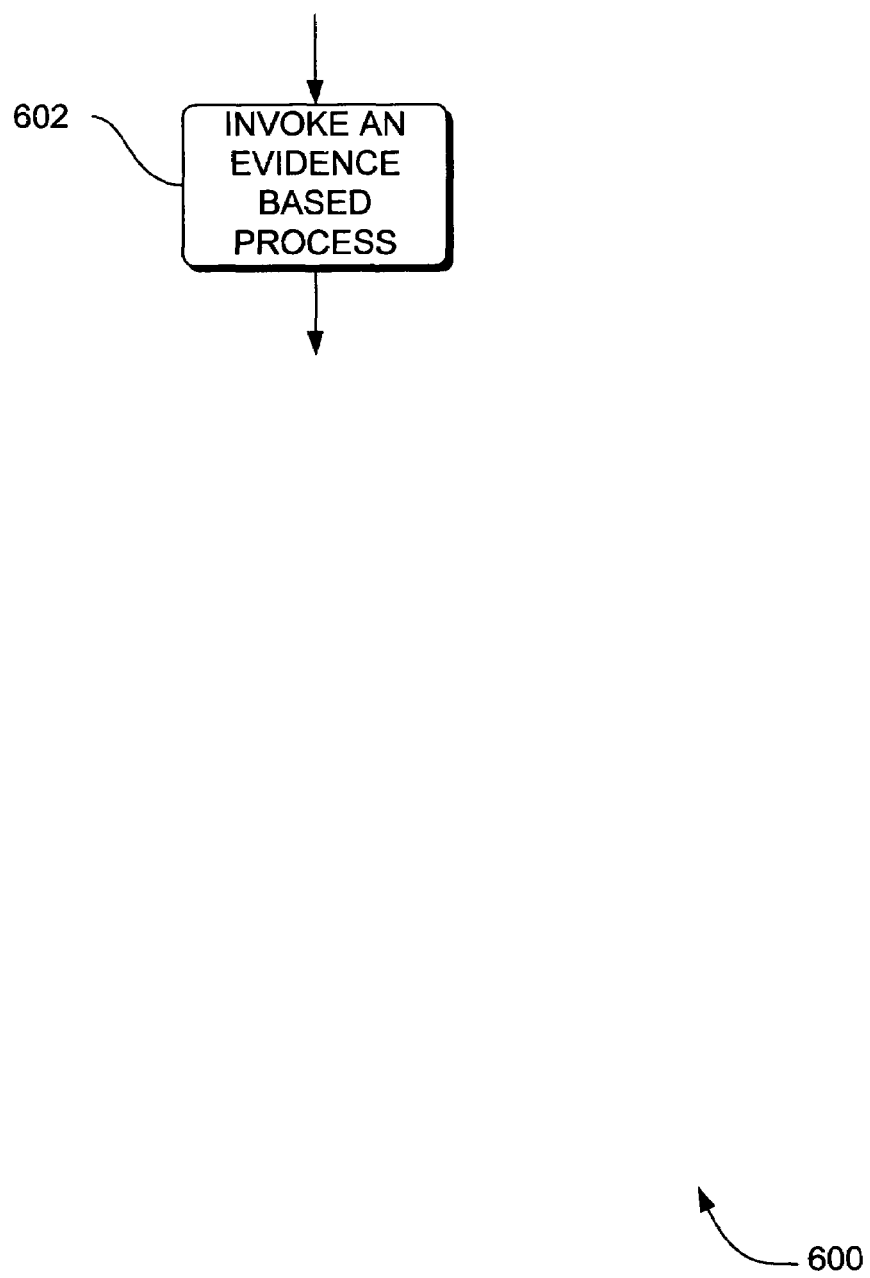
FIG. 6 is a flowchart of a method to locate a plurality of candidate collimation edges according to an embodiment.

Method 200 includes locating 202 a plurality of candidate collimation edges in a plurality of projected edge images. The plurality of projected edge images being associated with at least one indication of image intensity. One embodiment of the locating 202 is shown in FIG. 3 below and another embodiment is shown in FIG. 6 below.

Figure 8:
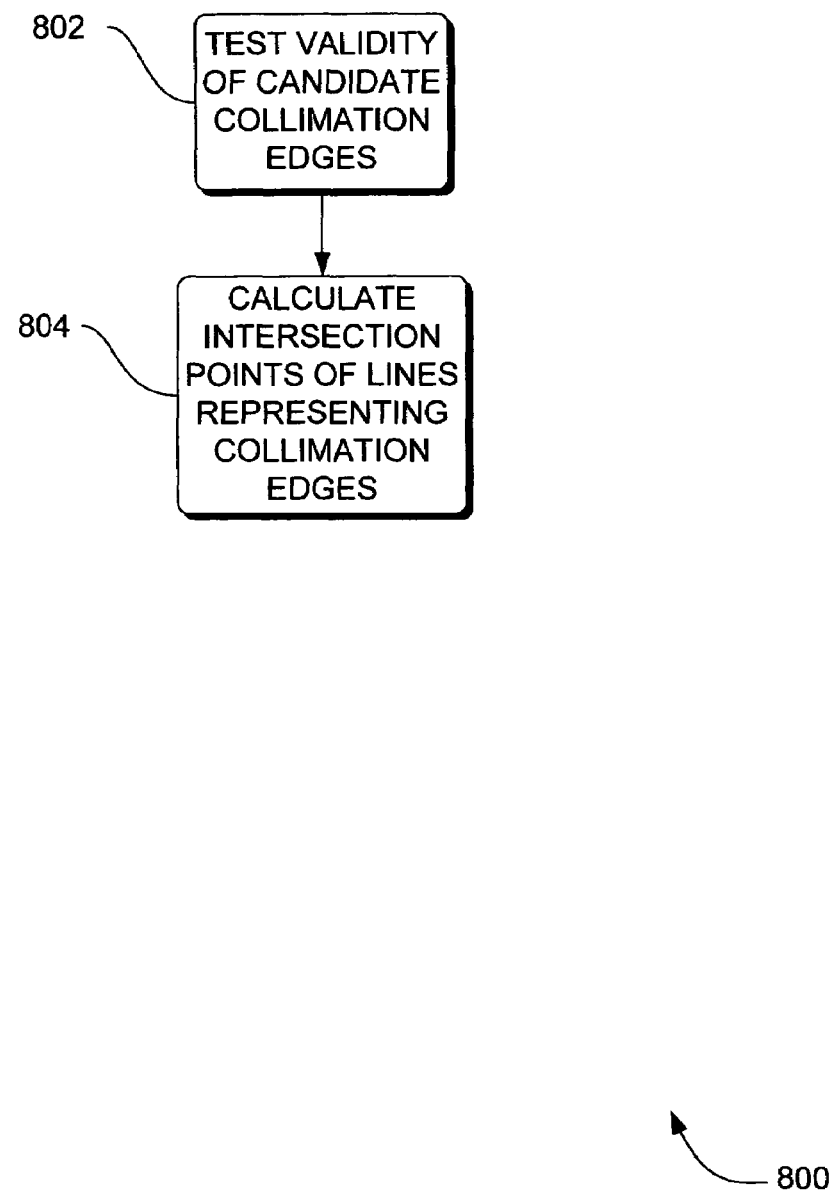
FIG. 8 is a flowchart of a method to determine validity of each of the candidate collimation edges according to an embodiment.

Method 200 also includes determining 204 validity of each of the candidate collimation edges. The determining 204 is performed in reference to a statistical analysis of the at least one indication of image intensity. One embodiment of the determining 204 is shown in FIG. 8 below.

Figure 3:
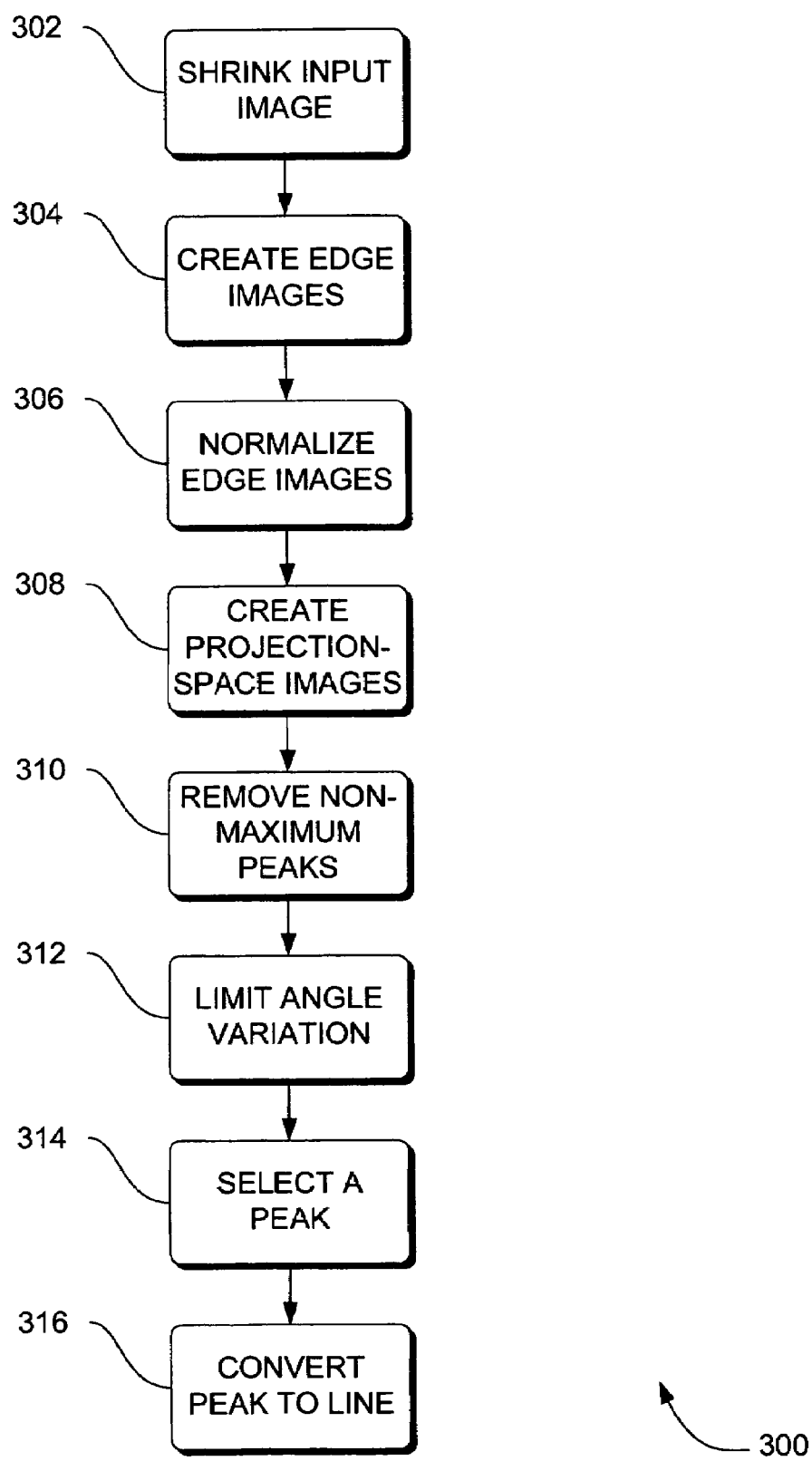
FIG. 3 is a flowchart of a method to locate a plurality of candidate collimation edges according to an embodiment.

FIG. 3 is a flowchart of a method 300 to locate a plurality of candidate collimation edges according to an embodiment. Method 300 is one embodiment of locating 202 a plurality of candidate collimation edges in FIG. 2.

Method 300 includes shrinking 302 an input image, such as raw image 104 in FIG. 1. In some embodiments shrinking is reduction of the physical size of the raw image 104, such as reducing a raw image 104 having 2000 by 2000 pixels to a size of 500 by 500 pixels.

In some embodiments, the shrinking is performed using the nearest-neighbor interpolation method, in which no pixel averaging is used. The input to a component that performs the shrinking includes a detector-corrected (un-cropped) image, such as raw image 104 named M. An output of the component is a shrunken image. One of the input parameters is an image shrink factor of type integer named SHRINK, having a range of enumerated values (e.g. 2, 4, 8, and 16).

Method 300 subsequently includes creating 304 a plurality of edge images for each side of the shunken input image.

In some embodiments of creating a plurality of edges, the following four edge images are created by convolving the input image M 104 with the corresponding kernels: Collimator down (CD) image: M is convolved with kernel1; Collimator up (CU) image: M is convolved with kernel2; Collimator right (CR) image: M is convolved with kernel3; Collimator left (CL) image: M is convolved with kernel4. The above four kernels are formed by extending the Sobel kernel. The vertical Sobel filter kernel is shown below in Table 1:

TABLE 1

| | | |
|---|---|---|
| 1 | 2 | 1 |
| 0 | 0 | 0 |
| −1 | −2 | −1 |

In Table 1, the Sobel kernel is extended to detect collimation edges.

A kernel shown in Table 2 below is used to emphasize the horizontal edge for collimator down region:

TABLE 2

| | | |
|---|---|---|
| 1 | 2 | 1 |
| 1 | 2 | 1 |
| 1 | 2 | 1 |
| 1 | 2 | 1 |
| 0 | 0 | 0 |
| −1 | −2 | −1 |
| −1 | −2 | −1 |
| −1 | −2 | −1 |
| −1 | −2 | −1 |

An edge image for collimator down is created in reference to Table 2. The kernel used to detect edge of collimator down region is simply flipped upside down, to detect the edge of collimator up region.

TABLE 3

| | | |
|---|---|---|
| −1 | −2 | −1 |
| −1 | −2 | −1 |
| −1 | −2 | −1 |
| −1 | −2 | −1 |
| 0 | 0 | 0 |

TABLE 3-continued

| | | |
|---|---|---|
| 1 | 2 | 1 |
| 1 | 2 | 1 |
| 1 | 2 | 1 |
| 1 | 2 | 1 |

An edge image is created for an upper collimation edge in reference to Table 3. To detect edges for collimator right and collimator left regions, the kernels used for collimator up and collimator down are transposed, as shown in Table 4 and Table 5 below, respectively:

TABLE 4

| 1 | 1 | 1 | 1 | 0 | −1 | −1 | −1 | −1 |
|---|---|---|---|---|---|---|---|---|
| 2 | 2 | 2 | 2 | 0 | −2 | −2 | −2 | −2 |
| 1 | 1 | 1 | 1 | 0 | −1 | −1 | −1 | −1 |

An edge image is created for a right side collimation edge in reference to Table 4.

TABLE 5

| −1 | −1 | −1 | −1 | 0 | 1 | 1 | 1 | 1 |
|---|---|---|---|---|---|---|---|---|
| −2 | −2 | −2 | −2 | 0 | 2 | 2 | 2 | 2 |
| −1 | −1 | −1 | −1 | 0 | 1 | 1 | 1 | 1 |

An edge image is created for a left side collimation edge in reference to Table 5.

Before convolution, raw image M 104 is mirror-padded, in which input array values outside the bounds of the array are computed by mirror-reflecting the array across the array border. After convolution, the extra "padding" is discarded and the resulting edge images are therefore the same size as that of raw image M 104.

In some embodiments, creating 304 a plurality of edges is performed by a component that receives the shrunken image, and generates four edge images, named CD, CU, CR, and CL.

Thereafter the edge images of each side of the shrunken input image are normalized 306.

In some embodiments of normalizing 304, the raw image 104 is mirror-padded and thereafter convolved with a Gaussian low pass kernel to generate a low pass (blurred) image named BM. The window size for this kernel is defined by a parameter named GBlurkernel, while the standard deviation (sigma) is defined by a parameter GBlurSigma. Thereafter each pixel of each edge is divided by BM in order to create the corresponding normalized edge image that can be name NCD, NCU, NCR and NCL. In this embodiment, a component that performs the normalizing actions receives edge images named CD, CU, CR, and CL and generates corresponding normalized edge images named NCD, NCU, NCR, and NCL. Parameters of the component include GBlurKernel, which represents a square window size (in pixels) of the Gaussian kernel that is an integer having a range of 0 to 15 and parameter GblurSigma, which represents a standard deviation (in pixels) of the Gaussian kernel that is an integer having a range of 0 to 5.

Subsequently, method 300 includes creating 308 a plurality of projection-space images for each side of the shrunken input image.

In some embodiments creating 308 the projection-space images includes performing a Radon transform operation with an angle range of between 0 degrees and 179 degrees. In those embodiments, four projection-space images named PCD, PCU, PCR, and PCL corresponding to the normalized edge images NCD, NCU, NCR and NCL are created using the Radon transform operation. Furthermore, each column of a projection-space image is a projection (sum) of the intensity values along the specified radial direction (oriented at a specific angle). In some embodiments the continuous form of the Radon transform is shown in Table 6 below:

TABLE 6

$$R_\theta(x') = \int_{-\infty}^{\infty} f(x'\cos\theta - y'\sin\theta, x'\sin\theta + y'\cos\theta) dy' \text{ where,}$$

$$\begin{bmatrix} x' \\ y' \end{bmatrix} = \begin{bmatrix} \cos\theta & \sin\theta \\ -\sin\theta & \cos\theta \end{bmatrix} \begin{bmatrix} x \\ y \end{bmatrix}$$

In table 5, the Radon transform of f(x,y) is the line integral of f parallel to the y'-axis. The center of this projection is the center of the image. The Radon transform is always performed with the angle range of 0° to 179°. The angle interval (difference between two consecutive projection angles) is defined by a parameter named AngleStep. Therefore, the number of columns in each projection-space image is equal to the angle range divided by the angle interval/step.

In this embodiment, a component that creates 308 a plurality of projection-space images receives normalized edge images, NCD, NCU, NCR, and NCL and generates corresponding projection-space images, PCD, PCU, PCR and PCL. The component includes a parameter named AngleStep which specifies a step size between consecutive projection angles that is an integer having a range of 1 to 5.

Method 300 also includes removing 310 local non-maximum peaks in each of the projection-space images for each side of the shunken input image.

Some embodiments of removing 310 the local non-maximum peaks include setting a pixel having a non-maximum magnitude in a selected window to zero. In those embodiments, in every projection-space image, the local non-maximum peaks are removed to account for the potential effects of noise. For every projection-space image (e.g. PCD, PCU, PCR, and PCL), a corresponding new projection-space (e.g. MPCD, MPCU, MPCR, and MPCL) image is created. Where the projection space image is named P and the new projection space image is named P', for every pixel in the projection space image P(x,y), a square window around it is selected. The size of this window is defined by the NMSkernel parameter (in pixels). For image pixels on the image edges, zero padding is implemented. If the pixel P (x,y) has the maximum magnitude in the selected window then pixel P'(x,y) is equal to P (x,y), otherwise pixel P'(x,y) is set to a value of zero.

In these embodiments, a component that removes the local non-maximum peaks by setting a pixel having a non-maximum magnitude in a selected window to zero the component receives projection-space images, PCD, PCU, PCR, and PCL, and generates projection-space images with non-maximum peaks removed MPCD, MPCU, MPCR, and MPCL. Parameters of the component include NMSkernel that defines square kernel size of the filter, NMSkernel being of type integer and having a range from 1 to 15.

Thereafter, method 300 includes limiting 312 an angle variation in each of the projection-space images for each side of the shunken input image. In some embodiments of limiting 312, in every projection-space image, one column corresponds to one angle theta (where the angle varies from 0° to 179°). A data structure designated as MPCD that represents columns corresponding to 0° to 45° and 136° to 179° are set to zero, a data structure designated as MPCU: columns corresponding to 0° to 45° and 136° to 179° are set to zero, a data structure designated as MPCR that represents columns corresponding to 46° to 135° are set to zero, a data structure designated as MPCL that represents columns corresponding to 46° to 135° are set to zero.

Figure 4:
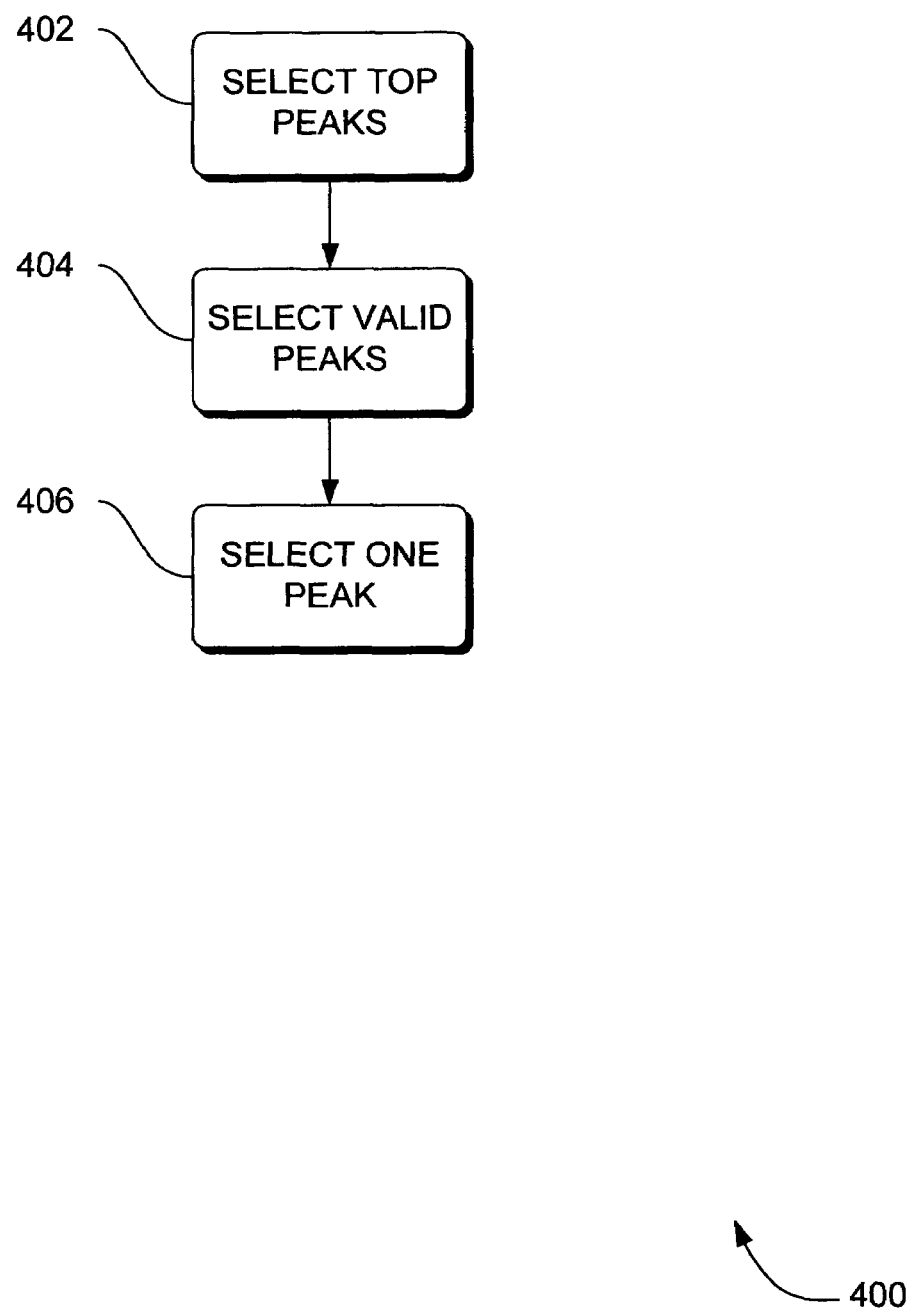
FIG. 4 is a flowchart of a method to select one peak in each of the projection-space images for each side according to an embodiment.

In these embodiments, a component that limits the angle variation in each of the projection-space images for each side of the shunken input image receives projection-space images with non-maximum peaks removed, designated MPCD, MPCU, MPCR, and MPCL and generates projection-space images designates as MPCD, MPCU, MPCR, and MPCL with angle limitation applied. The component includes a parameter designated as MarkerThresh which specifies which range of angles will be limited Thereafter one peak in each of the projection-space images for each side is selected 314. One embodiment of selecting 314 is shown in FIG. 4.

In some embodiments, collimation edges in image space are usually indicated by a compact peak with high magnitude in the projection-space image. A magnitude of a peak in the projection-space image is related to the length of the corresponding straight edge in image space. Compactness of a peak in the projection-space image indicates the extent of linearity of the corresponding straight edge in image space. Compactness is determined with an area measure as explained below. The lower the area measure is, the more compact is the peak considered. A threshold is set for both the area of a peak as well as the magnitude of the peak in order to discount spurious peaks due to noise or anatomy.

Method 300 also includes converting 316 peak coordinates in the projection-ages space images are to line equations corresponding to collimation edges in image intensity. Some embodiments of converting 316 peak coordinates include calculating Cartesian coordinate equations in the image intensity.

In some embodiments of converting 316 peak coordinates, coordinates of the four peaks selected in selecting 314, one peak in each of projection-space image, is used to calculate the radial coordinates in the image space. These four selected peaks in the projection-space image correspond to four dominant straight edges in the image space. These lines are the candidate collimation edges. The theta values and the distances of each line from the origin are calculated. These values represent a line in the following equation in Table 7 below:

TABLE 7

$S = A \cos \theta + B \sin \theta$

In table 6, Cartesian coordinate equations in the image space are calculated for the four candidate collimation edge lines.

In some embodiments, converting 316 peak coordinates is performed by a component that receives four selected peaks designated as PeakCD, PeakCU, PeakCR, and PeakCL from projection-space image corresponding to dominant edges in the image space. The component generates line equations in image space for the four candidate collimation edges that are Cartesian coordinates.

Some embodiments of method 300 make use of the fact that a compact peak, with high magnitude in a projection-space represents a collimation edge in image space. Magnitude of a peak in the projection-space image is related to length of the corresponding straight edge in image space. Compactness is determined with an area measure. In this process, first normalized edge images for each collimator region is formed. Thereafter projection space images are created using the Radon transform. The most compact peak with high magnitude is identified in projection space, which is then converted to a candidate line in image space. Candidate lines are then tested using image space statistics to confirm whether they are true collimation edges.

Thereafter in some embodiments, intersection points of all collimation edges are calculated in order to define the vertices of the collimated region in the image. The Intersection points are designated as p1, p2, p3 and p4. Subsequently, in some embodiments, method 300 performs optimally when the collimator has at most four blades/edges, when the collimation edges are straight (circular or custom-shape collimation is not explicitly detected), and when the collimated regions (low signal/counts), whenever present, are in the image periphery (patient shielding is not explicitly detected).

Input data to method 300 is the input image that is obtained after detector corrections. Output of method 300 includes vertices of the polygonal (4 sides) collimated region in the input image. In the situation where a collimation edge is not present, the edge of the image is designated as the collimation edge.

FIG. 4 is a flowchart of a method 400 of selecting one peak in each of the projection-space images for each side. Method 400 is one embodiment of selecting 314 in FIG. 3.

Figure 5:
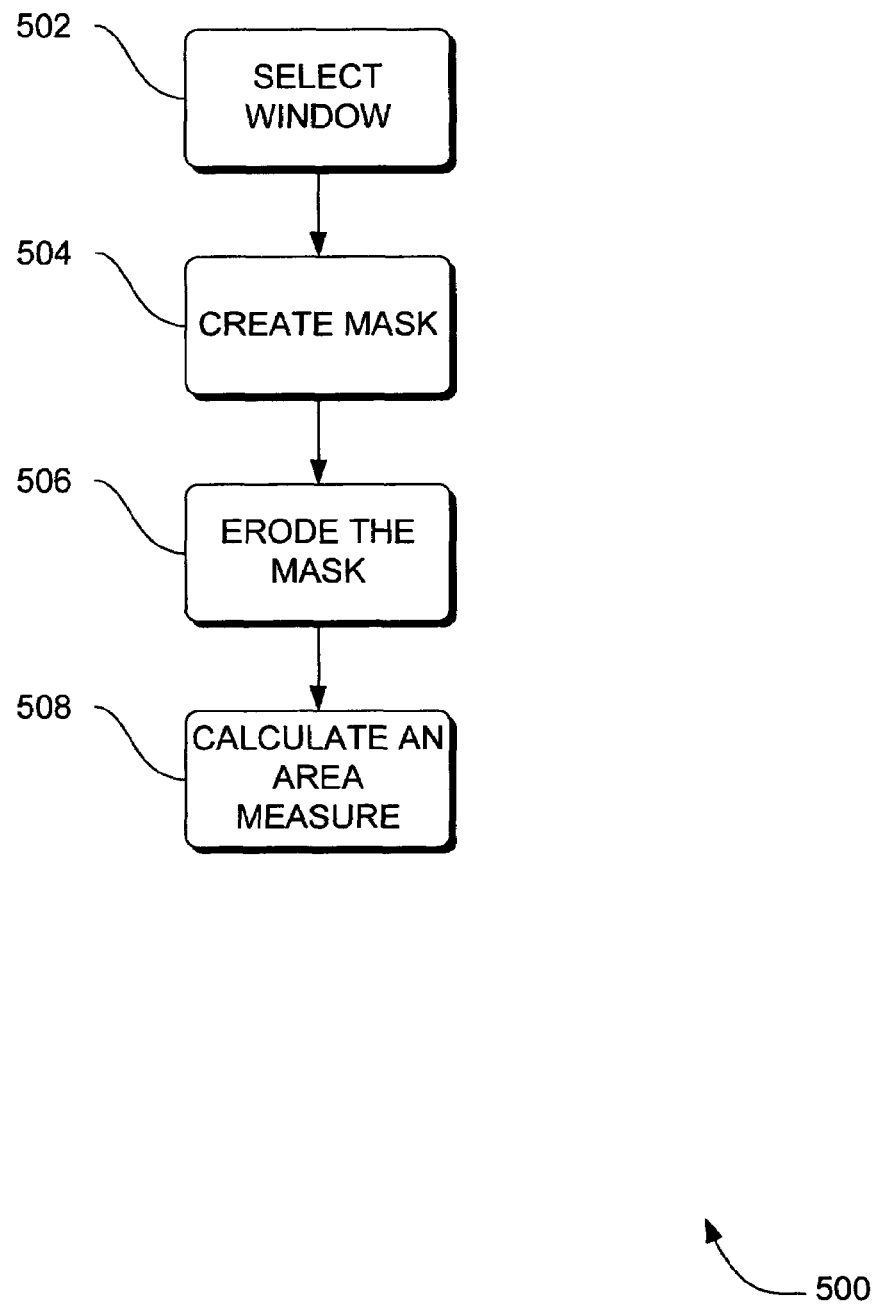
FIG. 5 is a flowchart of a method to select candidate peaks, according to an embodiment.

Method 400 includes selecting 402 top candidate peaks. In one embodiment, the top five candidate peaks are selected. One embodiment of selecting 402 is shown in FIG. 5 below.

Method 400 also includes selecting 404 valid peaks from the selected top candidate peaks of action 402.

In some embodiments of selecting 404 valid peaks, from among the peaks selected in action 402. Valid peaks are selected depending on, if for each peak: All the pixels in the mask (with mask value of 1) have projection-space image magnitudes lesser than that of the peak itself; the projection-space image magnitude of a given peak is greater than (MaxPspace×projspacethreshold) where MaxPspace is the maximum magnitude in the projection-space image and projspacethreshold is a parameter; and the area measure (in pixels) is less than the area threshold parameter greathreshold.

Method 400 also includes selecting 406 a peak corresponding to a most dominant straight edge.

In some embodiments of selecting 406 a peak corresponding to the most dominant edge, for each projection-space image, the peak with the minimum area (from the valid peaks selected in the previous step) is identified as corresponding to a candidate collimation edge. The coordinates of this peak in the projection-space are thereafter stored. For a component the selects a peak corresponding to the most dominant edge, the component receives projection-space images with non-maximum peaks removed and angle restriction applied to, designated as NPCD, NPCU, NPCR, and, NPCL, and also receives projection-space images PCD, PCU, PCR, and PCL. The components generates coordinates of four identified peaks in the projection-space images, one in each projection-space image designated as PeakCD, PeakCU, PeakCR, and PeakCL. The component also includes a parameter designated as wlevelthresh which represents a window threshold for every selected peak in a projection-space image, wlevelthresh being of type float and having a range from 0 to 100. The component also includes a parameter designed as maskthreshold that represents a mask threshold of type float having a range from 0 to 1. The component also includes a parameter designed as projspacethreshold which represents a valid peak threshold in the projection-space image, projspacethreshold being of type of float and having a range from 0 to 1. The component also includes a parameter designed as greathreshold which represents an area threshold for selected valid peaks, area threshold being of type integer and having a range from 0 to 5000.

FIG. 5 is a flowchart of a method 500 of selecting candidate peaks, according to an embodiment. Method 500 is one embodiment of selecting 402 candidate peaks in FIG. 4.

Method 500 includes selecting 502 a window around a peak and creating 504 a mask from the window.

In some embodiments of selecting 502 a window around a peak, a window of pixels (from original projection space PCD, PCU, PCR, and PCL) around the peak (in the MPCD, MPCU, MPCR, and MPCL) is selected using the following criterion: All pixel values within the window must be greater than (PeakPspace/wlevelthresh) where PeakPspace is the projection-space magnitude of the peak and wlevelthresh is a parameter.

In some embodiments of creating 504 a mask, the window selected in action 502 is normalized by dividing all its values by its maximum value. The window is threshold to generate a binary mask window. This threshold is defined by the mask-threshold parameter. Pixels in the window with magnitudes above the maskthreshold parameter are set to a value of one, while pixels below this threshold are set to a value of zero.

Thereafter, method 500 includes eroding 506 the mask.

In some embodiment of eroding 506 the mask, to correct area calculation, only the area connected to the peak under consideration is be used. This is assured by performing morphological erosion on the binary mask. Erosion causes an object to shrink, the amount or the way that the object is shrunk depends on the structuring element. Erosion is defined in table 8 below:

TABLE 8

$E(A, B) = \cap_{\beta \in B}(A - \beta)$ where, $-B = \{-\beta | \beta \in B\}$.

In table 8, A is the image and B is the structuring element. Accordingly, a square structuring element is used as shown in Table 9 below:

TABLE 9

| 1 | 1 |
|---|---|
| 1 | 1 |

In table 9, a structuring element for erosion has origin in the top left quadrant. Erosion can be implemented as follows: For every pixel of the mask window with mask value of 1, three points neighboring the pixel are selected according to the above structuring element. If all the above neighbors are of binary value one, then the pixel under consideration is retained, else it is removed (set to zero in the mask).

Thereafter, method 500 includes calculating 508 an area measure of the eroded mask. In some embodiments of calculating 508 the area measure, the area measure (in pixels) is calculated by summing up all mask values. Therein, only mask pixels with value of 1 will contribute to sum.

FIG. 6 is a flowchart of a method 600 of locating a plurality of candidate collimation edges according to an embodiment. Method 600 is one embodiment of locating 202 a plurality of candidate collimation edges in FIG. 2.

Method 600 includes invoking 602 an evidence-based process to locate the plurality of candidate collimation edges in the plurality of projection images. The method 300 in FIG. 3 is an example of an evidence-based process.

Figure 7:
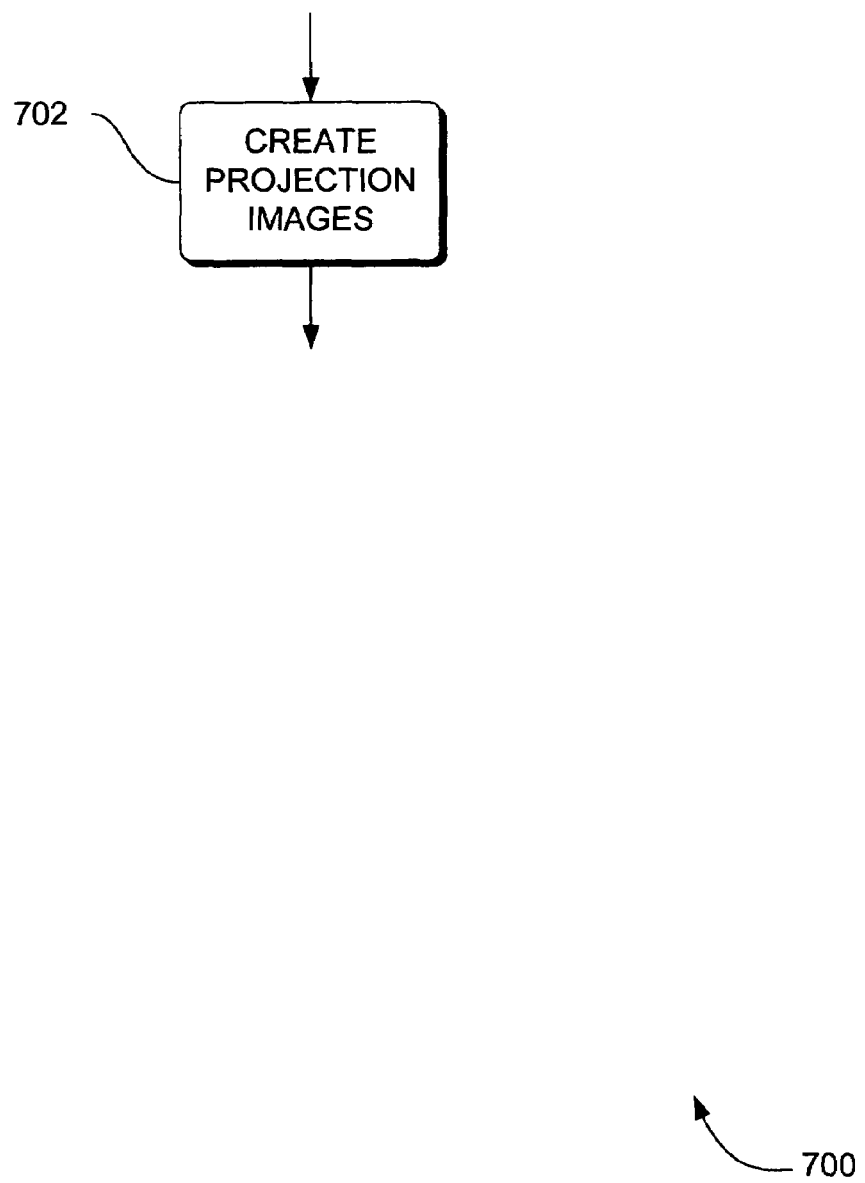
FIG. 7 is a flowchart of a method of additional action to locate a plurality of candidate collimation edges according to an embodiment.

FIG. 7 is a flowchart of a method 700 of additional action in locating a plurality of candidate collimation edges according to an embodiment. Method 700 includes an action that in some embodiments is additional to method 300. Method 700 includes creating 702 the plurality of projection images from edge information of a raw image. The raw image is obtained after applying corrections to detector data referred to as pre-processing in FIG. 1.

FIG. 8 is a flowchart of a method 800 to determine validity of each of the candidate collimation edges according to an embodiment. Method 800 is one embodiment of determining 204 in FIG. 2.

Figure 9:
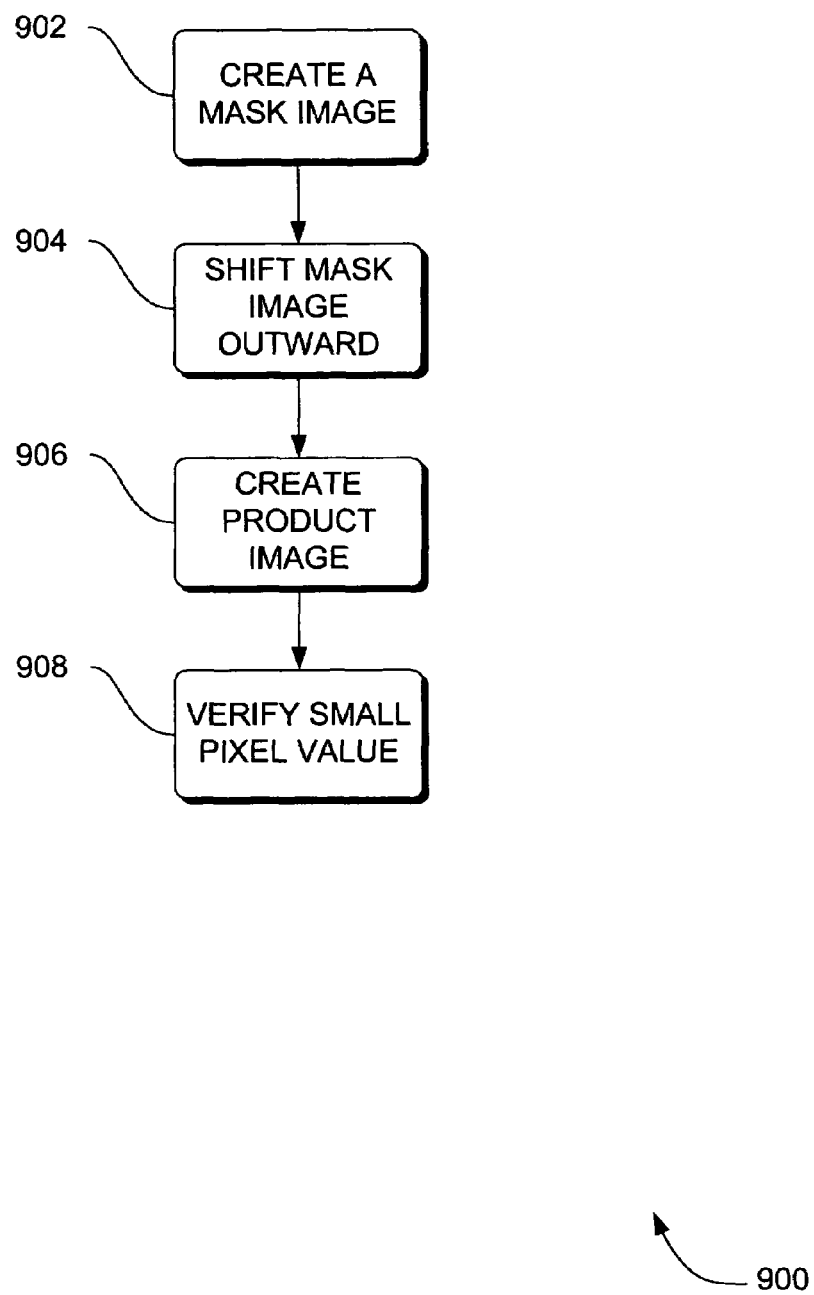
FIG. 9 is a flowchart of a method to test validity of a candidate collimation edge according to an embodiment.

Method 800 includes testing 802 validity of a plurality of candidate collimation edges for each side. One embodiment of testing 802 is shown in FIG. 9.

Method 800 also includes calculating 804 intersection points of lines representing collimation edges. Some embodiments of calculating 804 intersection points include creating equations of the form Ax+By=C corresponding to collimation edges and simultaneously solving each pair of equations corresponding to adjacent image sides. A, B and C represent constants and x and y represent values along the X and Y axis, respectively, of a Cartesian graph.

In the situation where the lower collimation edge is not present, X is set to the maximum limit of the X axis. In the situation where upper collimation edge is not present, X is set to the minimum limit of X axis. In the situation where the right-side collimation edge is not present, Y is set to the maximum limit of Y axis. In the situation where the left-side collimation edge is not present, Y is set the minimum limit of Y axis.

Thereafter, the coordinates of the intersection points are translated back to that of the original (unshrunk) image IM p1, p2, p3, and p4.

FIG. 9 is a flowchart of a method 900 of testing validity of a candidate collimation edge according to an embodiment. Method 900 is one method of testing 802 in FIG. 8.

Method 900 includes creating 902 a mask image for each candidate edge. In some embodiments each mask image is created being dependent on the position of each candidate line and on the collimation edge it represents. For example, in a collimator-down mask image, pixels below the collimator-down candidate line are set to a value of one and all other pixels are set to a value of zero. Similarly, in a collimator-right mask image, pixels to the right of the collimator-right candidate line are set to a value of one and all other pixels are set to a value of zero, and so forth.

Method 900 also includes shifting 904 outward each mask image. In some embodiments, each mask image is shifted outwards by a number of pixels represented by a parameter designed as pixelshift. This accounts for a dispersion, which might be present in the image around the collimation edges. Outwards is downward for MCD, upward for MCU, towards the right for MCR, and towards left for MCL In some embodiments method 900 also includes Four product images of these mask images and the input image 104 are created by pixel by pixel multiplication of each mask with M, MCD, MCU, MCR, and MCL.

Method 900 also includes using 906 the mask to distinguish collimated area from uncollimated area in image and verifying 908 that a maximum pixel value in a corresponding collimated area is small in comparison to pixel values in uncollimated areas.

In some embodiments of verifying 908 includes calculating the following image statistics: M_upper=average of upper RRThresh percentile values in image, where RRThresh is a parameter, M_lower=average of lowest LowVals values in image; and linedecision=RangeThresh*(M_upper−M_lower)+M_lower, where RangeThresh is a parameter. A candidate edge is considered valid if the maximum value in its corresponding masked image is less than linedecision. All candidate edges not satisfying this criterion are considered invalid.

In some embodiments, a component that performs method 900 of testing validity of a candidate collimation edge receives edge equations in image space for the four candidate collimation edge lines and generates edge equations in image space for the valid candidate collimation edge lines. The component also includes parameter designated RRThresh which represents a percentile of image values defining ceiling being of type integer and having a range from 0 to 100, a parameter designated Rangethresh that represents a fraction of range to be considered being of type float and having a range: from 0 to 1.

Figure 10:
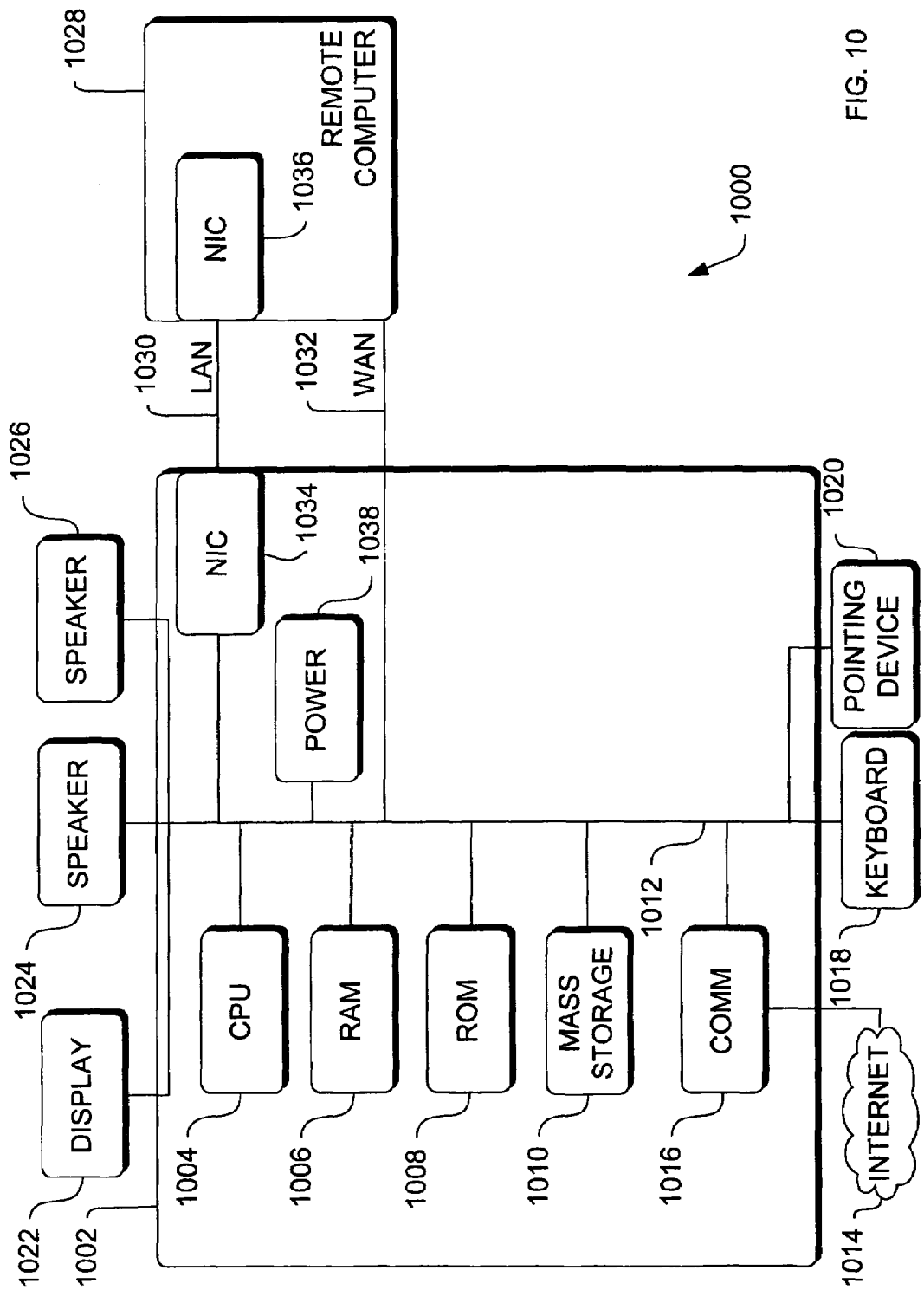
FIG. 10 is a block diagram of the hardware and operating environment in which different embodiments can be practiced according to an embodiment.

In some embodiments, methods 200-900 are implemented as a computer data signal embodied in a carrier wave, that represents a sequence of instructions which, when executed by a processor, such as processor 1004 in FIG. 10, cause the processor to perform the respective method. In other embodiments, methods 200-900 are implemented as a computer-accessible medium having executable instructions capable of directing a processor, such as processor 1004 in FIG. 10, to perform the respective method. In varying embodiments, the medium is a magnetic medium, an electronic medium, or an optical medium.

Hardware and Operating Environment

FIG. 10 is a block diagram of the hardware and operating environment 1000 in which different embodiments can be practiced. The description of FIG. 10 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 1002 includes a processor 1004, commercially available from Intel, Motorola, Cyrix and others. Computer 1002 also includes random-access memory (RAM) 1006, read-only memory (ROM) 1008, and one or more mass storage devices 1010, and a system bus 1012, that operatively couples various system components to the processing unit 1004. The memory 1006, 1008, and mass storage devices, 1010, are types of computer-accessible media. Mass storage devices 1010 are more specifically types of nonvolatile computer-accessible media and can include one or more hard disk drives, floppy disk drives, optical disk drives such as CDs and DVDs, and tape cartridge drives. The processor 1004 executes computer programs stored on the computer-accessible media.

Computer 1002 can be communicatively connected to the Internet 1014 via a communication device 1016. Internet 1014 connectivity is well known within the art. In one embodiment, a communication device 1016 is a modem that responds to communication drivers to connect to the Internet via what is known in the art as a "dial-up connection." In another embodiment, a communication device 1016 is an Ethernet® or similar hardware network card connected to a local-area network (LAN) that itself is connected to the Internet via what is known in the art as a "direct connection" (e.g., T1 line, etc.).

A user enters commands and information into the computer 1002 through input devices such as a keyboard 1018 or a pointing device 1020. The keyboard 1018 permits entry of textual information into computer 1002, as known within the art, and embodiments are not limited to any particular type of keyboard. Pointing device 1020 permits the control of the screen pointer provided by a graphical user interface (GUI) of operating systems such as versions of Microsoft Windows®. Embodiments are not limited to any particular pointing device 1020. Such pointing devices include mice, touch pads, trackballs, remote controls and point sticks. Other input devices (not shown) can include a microphone, joystick, game pad, satellite dish, scanner, or the like.

In some embodiments, computer 1002 is operatively coupled to a display device 1022. Display device 1022 is connected to the system bus 1012. Display device 1022 permits the display of information, including computer, video and other information, for viewing by a user of the computer. Embodiments are not limited to any particular display device 1022. Such display devices include cathode ray tube (CRT) displays (monitors), as well as flat panel displays such as liquid crystal displays (LCD's). In addition to a monitor, computers typically include other peripheral input/output devices such as printers (not shown). Speakers 1024 and 1026 provide audio output of signals. Speakers 1024 and 1026 are also connected to the system bus 1012.

Computer 1002 also includes an operating system (not shown) that is stored on the computer-accessible media RAM 1006, ROM 1008, and mass storage device 1010, and is and executed by the processor 1004. Examples of operating systems include Microsoft Windows®, Apple MacOS®, Linux®, UNIX®. Examples are not limited to any particular operating system, however, and the construction and use of such operating systems are well known within the art.

Embodiments of computer 1002 are not limited to any type of computer 1002. In varying embodiments, computer 1002 comprises a PC-compatible computer, a MacOS®-compatible computer, a Linux®-compatible computer, or a UNIX®-compatible computer. The construction and operation of such computers are well known within the art.

Computer 1002 can be operated using at least one operating system to provide a graphical user interface (GUI) including a user-controllable pointer. Computer 1002 can have at least one web browser application program executing within at least one operating system, to permit users of computer 1002 to access an intranet, extranet or Internet world-wide-web pages as addressed by Universal Resource Locator (URL) addresses. Examples of browser application programs include Netscape Navigator® and Microsoft Internet Explorer®.

The computer 1002 can operate in a networked environment using logical connections to one or more remote computers, such as remote computer 1028. These logical connections are achieved by a communication device coupled to, or a part of, the computer 1002. Embodiments are not limited to a particular type of communications device. The remote computer 1028 can be another computer, a server, a router, a network PC, a client, a peer device or other common network node. The logical connections depicted in FIG. 10 include a local-area network (LAN) 1030 and a wide-area network (WAN) 1032. Such networking environments are commonplace in offices, enterprise-wide computer networks, intranets, extranets and the Internet.

When used in a LAN-networking environment, the computer 1002 and remote computer 1028 are connected to the local network 1030 through network interfaces or adapters 1034, which is one type of communications device 1016. Remote computer 1028 also includes a network device 1036. When used in a conventional WAN-networking environment, the computer 1002 and remote computer 1028 communicate with a WAN 1032 through modems (not shown). The modem, which can be internal or external, is connected to the system bus 1012. In a networked environment, program modules depicted relative to the computer 1002, or portions thereof, can be stored in the remote computer 1028.

Computer 1002 also includes at least one power supply 1038. Each power supply can be a battery.

Implementation

Figure 11:
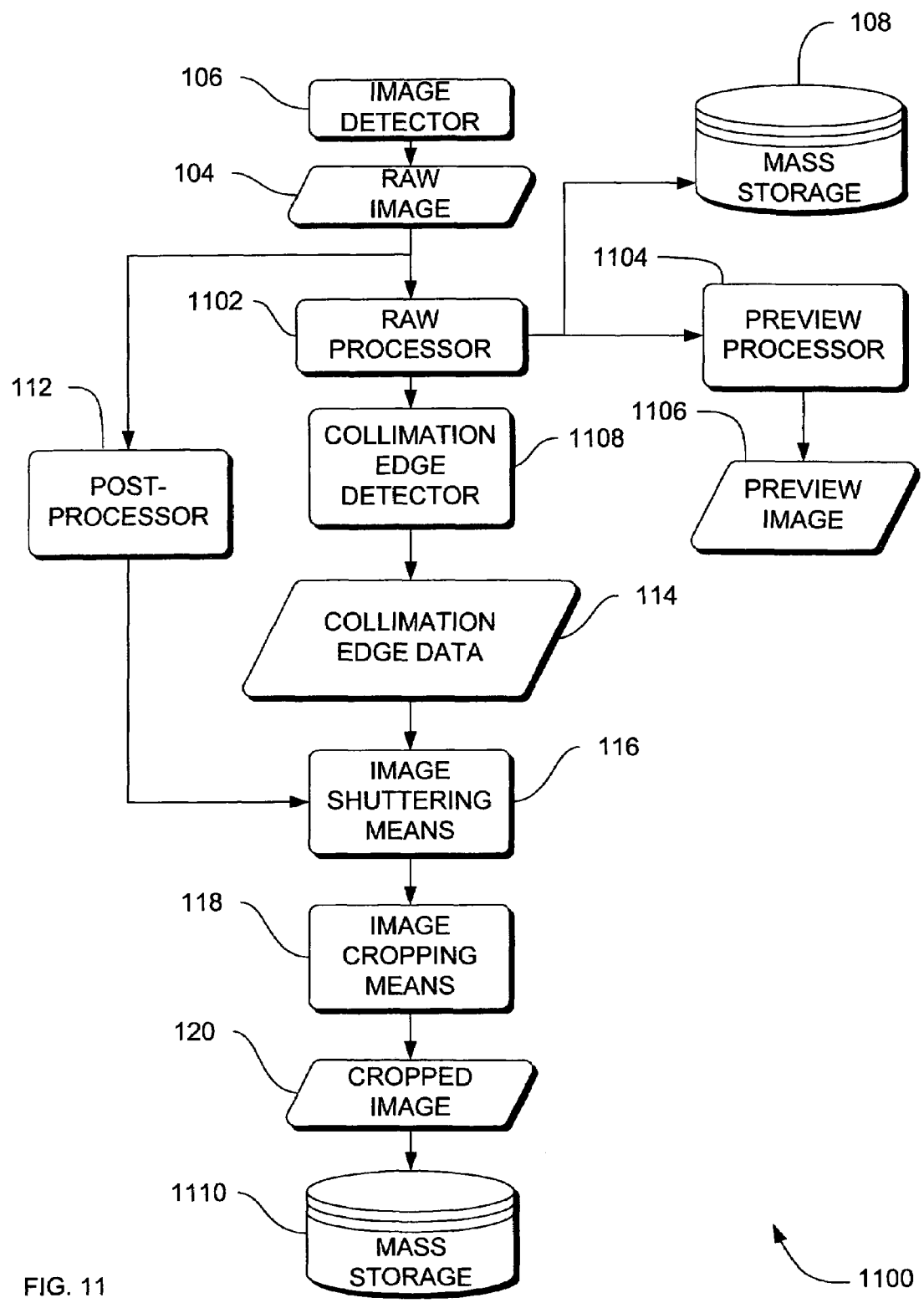
FIG. 11 is a block diagram apparatus operable to crop a collimated portion of an image according to an embodiment.

Referring to FIG. 11, particular implementations are described in conjunction with the system overview in FIG. 1 and the method described in conjunction with FIG. 3.

FIG. 11 is a block diagram apparatus operable to crop a collimated portion of an image. Apparatus 1100 solves the need in the art to precisely and conveniently identify and locate collimation edges in X-ray images.

Apparatus 1100 includes a preprocessor 1102 that performs operations such as correcting for detector gain variations and image rotation and/or image flip on the uncropped raw input image 104. The preprocessor 1102 does not crop the raw input image 104.

The preprocessor 1102 is also operable to store the raw uncropped, full size input image 104 on the mass storage device 108 in the same form as the raw input image is received from the digital image detector 106. Moreover, the preprocessor 1102 is also operable to transmit the raw input image 104 to a preview processor 1104 which provides a preview image 1106.

Apparatus 1100 also includes a collimation edge detector 1108 operable to detect collimation edges in the raw input image 104, and generate the collimation edge data 114 that describes four collimator vertices, which is often referred to as P1, P2, P3 and P4.

Apparatus 1100 further includes the post-processor 112 of the raw input image 104. Post-processing may include operations such as edge enhancement, dynamic range management and automated optimization of image brightness/contrast display settings.

Apparatus 1100 also includes shuttering means 116 that shutters a post-processed image in reference to the edges detected by the collimation edge detector 110. In some embodiments, apparatus also includes a means to perform manual shutter adjustment.

Apparatus 1100 also includes an image cropping means 118 that crops a shuttered image in reference to the collimation edge data 114. The shuttered image is cropped to the bounding rectangle that is enclosed by the FOV detected by the collimation edge detector 1108.

Thus, image cropping means 118 and apparatus 1100 provide the cropped image 120. The cropped image 120 is produced at least in part, if not entirely, in reference to the collimation edge data 114 extracted or derived from the preprocessed raw image 104 the raw image 104. Thus the computer-based implementation of apparatus 1100 allows the collimation edges in X-ray images to be more precisely and more conveniently identified and localized.

In some embodiments, apparatus 1100 also includes a mass storage device 1110 on which the cropped image is stored.

Apparatus that implements systems, methods and apparatus described herein can be embodied as computer hardware circuitry or as a computer-readable program, or a combination of both. In another embodiment, systems, methods and apparatus are implemented in an application service provider (ASP) system.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 1002 in FIG. 10, or on at least as many computers as there are components.

CONCLUSION

An image-based collimation edge detection system is described. Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all procedural, database and communication environments and alternate technologies, which provide the same functionality as, described herein.

We claim:

1. A computer-accessible storage medium having executable instructions to detect an edge of an image, the executable instructions capable of directing a processor to perform:

locating a plurality of candidate collimation edges in a plurality of projected edge images, the locating further comprising creating edge images of each side of an input image, creating projection-space images of each side of the input image, selecting a peak in each of the projection-space images of each side and converting peak coordinates in the projection-space images to line equations corresponding to the candidate collimation edges in the image intensity data, the plurality of projected edge images associated with image intensity data in a memory, the plurality of projected edge images being stored in the memory;

determining validity of each of the candidate collimation edges based on statistical analysis of the image intensity data; and storing the validity in the memory.

2. The computer-accessible storage medium of claim 1, wherein the locating further comprises:

shrinking an input image in the memory;

creating the plurality of edge images in the memory of each of the sides of the shrunken input image;

normalizing edge images of each side of the shrunken input image in the memory;

creating the plurality of projection-space images in the memory of each of the sides of the shrunken input image;

removing local non-maximum peaks in each of the projection-space images in the memory of each side of the shrunken input image;

limiting an angle variation in each of the projection-space images in the memory of each side of the shrunken input image selecting the peak in each of the projection-space images in the memory of each side; and converting the peak coordinates in the projection-space images in the memory to the line equations corresponding to the collimation edges in the image intensity data.

3. The computer-accessible storage medium of claim 1, wherein the locating further comprises:

invoking an evidence-based process to locate the plurality of candidate collimation edges in the plurality of projection images in the memory.

4. The computer-accessible storage medium of claim 1, the medium further comprising executable instructions capable of directing a processor to perform:

creating the plurality of projection images in the memory from edge information of a raw image in the memory.

5. The computer-accessible storage medium of claim 1, wherein the determining validity further comprises:

testing validity of candidate collimation edges in the memory of each side; and calculating intersection points for valid collimation edges in the memory.

6. A computer-accessible storage medium having executable instructions to detect an edge of an image, the executable instructions capable of directing a processor to perform:

shrinking an input image in the memory;

creating a plurality of edge images of each side of the input image in the memory;

normalizing edge images of each side of the input image in the memory;

creating a plurality of projection-space images for each side of the input image in the memory;

removing local non-maximum peaks in each of the projection-space images of each side of the input image in the memory;

limiting an angle variation in each of the projection-space images of each side of the input image in the memory;

selecting one peak in each of the projection-space images of each side in the memory;

converting peak coordinates in the projection-space images in the memory to line equations corresponding to candidate collimation edges in the image intensity data;

testing validity of a candidate collimation edge of each side in the memory; and calculating intersection points for valid collimation edges in the memory.

7. The computer-accessible storage medium of claim 6, wherein normalizing edge images further comprises:

dividing each of the edge images in the memory with a low-pass blurred image.

8. The computer-accessible storage medium of claim 6, wherein creating a plurality of projection-space images in the memory further comprises:

performing a Radon transform operation in the memory with an angle range of between 0 degrees and 179 degrees.

9. The computer-accessible storage medium of claim 6, wherein removing local non-maximum peaks further comprises:

setting a pixel having a non-maximum magnitude in a selected window in the memory to zero.

10. The computer-accessible storage medium of claim 6, wherein selecting one peak further comprises:

selecting candidate peaks in the memory;

selecting valid peaks from the selected top candidate peaks in the memory; and selecting a peak corresponding to the most dominant straight edge in the memory.

11. The computer-accessible storage medium of claim 10, wherein selecting candidate peaks further comprises:

selecting a window around a peak in the memory;

creating a mask in the memory;

eroding the mask in the memory; and calculating an area measure in the memory.

12. The computer-accessible storage medium of claim 6, wherein converting peak coordinates further comprises:

calculating Cartesian coordinate equations in the image intensity data in the memory.

13. The computer-accessible storage medium of claim 6, wherein testing validity of a candidate collimation edge further comprises:

creating a mask image in the memory;

shifting outward the mask image in the memory;

using the mask to distinguish a collimated area from an uncollimated area in the mask image in the memory; and verifying that a maximum pixel value in a corresponding collimated area is small in comparison to pixel values in uncollimated areas in the memory.

14. The computer-accessible storage medium of claim 6, wherein calculating intersection points further comprises:

creating equations in the memory of the form $Ax+By=C$ corresponding to collimation edges; and solving simultaneously in the memory each pair of equations corresponding to adjacent image sides in the memory.

15. A method to detect an edge of an image, the method comprising using a processor to perform:

accessing image intensity data in a memory;

obtaining a plurality of edge images of each side of an input image from the image intensity data in the memory;

creating projected edge images in the memory of each side of the input image from the edge images in the memory;

locating a plurality of candidate collimation edges in the plurality of projected edge images in the memory, the locating further comprising creating projection-space images each side of the input image, selecting a peak in each of the projection-space images of each side and converting peak coordinates in the projection-space images to line equations corresponding to the candidate collimation edges in the image intensity data;

determining validity of each of the candidate collimation edges based on statistical analysis of the image intensity data; and storing the validity in the memory.

16. The method of claim 15 wherein the locating further comprises:

creating the plurality of projection-space images in the memory from the projected edge images in the memory;

selecting the peak in each of the projection-space images in the memory; and converting the peak coordinates in the projection-space images in the memory to the line equations in the memory corresponding to the collimation edges in the image intensity data.

17. The method of claim 15 wherein the determining validity further comprises:

testing validity of candidate collimation edges of each side in the memory; and calculating intersection points in the memory for valid collimation edges.

18. A method to detect an edge of an image, the method comprising using a processor to perform:

accessing image intensity data in a memory;

shrinking an input image in the memory;

creating a plurality of candidate collimation edge images in the memory from the image intensity data of each side of the shrunken input image;

creating projected edge images in the memory from the edge images in the memory;

normalizing edge images of each side of the shrunken input image in the memory;

creating a plurality of projection-space images in the memory of each side of the shrunken input image;

removing local non-maximum peaks in each of the projection space images in the memory of each side of the shrunken input image;

limiting an angle variation in each of the projection-space images in the memory of each side of the shrunken input image;

selecting a peak in each of the projection-space images in the memory of each side;

converting the peak coordinates in the projection-space images in the memory to line equations corresponding to the candidate collimation edges in the image intensity data;

determining validity of each of the candidate collimation edge images based on statistical analysis of the image intensity data; and storing the validity in the memory.

19. The method of claim 18, wherein normalizing edge images further comprises:

dividing each of the edge images in the memory with a low-pass blurred image.

20. The method of claim 18, wherein removing local non-maximum peaks further comprises:

setting a pixel having a non-maximum magnitude in a selected window in the memory to zero.

* * * * *